United States Patent [19]

Mayr et al.

[11] Patent Number: 4,495,338

[45] Date of Patent: * Jan. 22, 1985

[54] COMPONENTS OF CATALYSTS FOR THE POLYMERIZATION OF OLEFINS

[75] Inventors: Adolfo Mayr, Ferrara, Italy; Ermanno Susa, Brussels, Belgium; Ettore Giachetti, Milan, Italy

[73] Assignee: Montecatini Edison S.p.A., Milan, Italy

[*] Notice: The portion of the term of this patent subsequent to Nov. 3, 1998 has been disclaimed.

[21] Appl. No.: 190,375

[22] Filed: Sep. 24, 1980

Related U.S. Application Data

[63] Continuation of Ser. No. 267,624, Jun. 29, 1972, abandoned, which is a continuation of Ser. No. 878,535, Nov. 20, 1969, abandoned.

[30] Foreign Application Priority Data

Nov. 21, 1968 [IT] Italy ............................. 24008 A/68

[51] Int. Cl.$^3$ .......................... C08F 4/02; C08F 10/00
[52] U.S. Cl. ................................ 526/125; 502/104; 502/105; 502/134; 526/122; 526/348; 526/351; 526/352; 526/906
[58] Field of Search .................... 252/429 C; 526/125; 502/104, 105, 134

[56] References Cited

U.S. PATENT DOCUMENTS

| | | | |
|---|---|---|---|
| 2,981,725 | 4/1961 | Luft et al. | 526/125 |
| 3,032,510 | 5/1962 | Tornqvist et al. | 526/158 |
| 3,058,963 | 10/1962 | Vandenberg | 526/151 |
| 3,238,146 | 3/1966 | Hewett et al. | 526/125 |
| 3,244,477 | 4/1966 | Nicco et al. | 526/158 |
| 3,298,965 | 1/1967 | Tornqvist | 526/158 |
| 3,392,159 | 7/1968 | Schooley et al. | 526/125 |
| 3,482,935 | 12/1969 | Trementozzi et al. | 526/158 |
| 4,298,718 | 11/1981 | Mayr et al. | 526/125 |

FOREIGN PATENT DOCUMENTS

| | | | |
|---|---|---|---|
| 703847 | 2/1965 | Canada | 526/138 |
| 872142 | 7/1961 | United Kingdom | 526/125 |

Primary Examiner—Edward J. Smith

[57] ABSTRACT

Catalysts useful in the polymerization of olefins, more particularly of ethylene and mixtures thereof with alpha-olefins and/or diolefins, are disclosed. The new catalysts are obtained by mixing a halide of titanium or vanadium in which the metal has a valency lower than 4, with a support comprising an anhydrous magnesium or zinc halide in an active form under particular conditions, and then activating the resulting product with a hydride or organometallic compound of a metal belonging to Groups I to III, inclusive, of the Mendelyeev Periodic System.

57 Claims, No Drawings

COMPONENTS OF CATALYSTS FOR THE POLYMERIZATION OF OLEFINS

This is a continuation of application Ser. No. 267,624 filed June 29, 1972, now abandoned, which in turn is a continuation of Ser. No. 878,535 filed Nov. 20, 1969, now abandoned.

THE PRIOR ART

From U.S. Pat. No. 3,130,003, there are known catalysts for the polymerization of olefins which consist of the product of reaction between organometallic compounds of metals belonging to Groups I to III inclusive of the Mendelyeev Periodic System and the product obtained by co-grinding a partially reduced transition metal halide, such as $TiCl_3$, with a minor amount, less than 50% in moles, of a halide of a metal belonging to Groups II or III. Preferably, the halide of the Group II or Group III metal is used in an amount comprised between 0.2 and 0.35 mole, per mole of the transition metal halide. The preferred Group II or Group III metal halide is aluminium chloride, and the preferred mixtures contain 3.0 moles of $TiCl_3$ per mole of $AlCl_3$.

Although said catalysts of the prior art have a relatively very high activity in the absence of substances normally used for regulating the molecular weight of the polymer formed within a range of practically interesting values, the activity of said catalysts falls off drastically when they are used in the presence of the molecular weight regulators.

British Pat. No. 904,510 describes polymerization catalysts of the so-called "Ziegler" type in which one of the catalyst-forming components is an inorganic halide, such as, for instance, magnesium dichloride, coated with a molecularly thin layer of a transition metal halide. On the whole, the transition metal halide is present on the carrier in amounts not exceeding 1% by weight, based on the weight of the carrier. According to said British patent, it is impossible to use the transition metal compound in an amount greater than 1% by weight, without considerably decreasing the activity of the catalyst.

The reason it is impossible to use amounts of the transition metal compound greater than 1% by weight is that, in the British patent, the inorganic halide used as the support is never subjected to any treatment capable of transforming it from an inert form to an active form which would yield catalysts having high activity even in the presence of large amounts of the transition metal compound.

The small amount of catalytically active compound on the support makes it necessary to use large amounts of the supported catalysts described in the British patent, in order to obtain the polymers in the high yields which are practical, with the consequent necessity to purify the polymers from catalyst residues at the end of the polymerization.

THE PRESENT INVENTION

One object of this invention is to provide new supported catalysts in which the support is in active form and which are highly active in the polymerization of olefins even when relatively large amounts of a transition metal compound are carried by the support, as well as in the presence of regulators of the molecular weight of the polymer produced.

This and other objects are achieved by the present invention in accordance with which it has been found, surprisingly, that valuable catalysts which are highly active in the polymerization of olefins, even in the presence of conventionally used molecular weight regulators, are obtained by (1) contacting a halide of Ti or V in which the metal has a valency lower than 4 with a support consisting of or containing an anhydrous Mg or Zn halide in an active form either under conditions such that the normally inert Mg or Zn halide is converted to an active form, or by converting the Mg or Zn halide to active form and then contacting it with the transition metal halide, and then (2) activating the product of (1) with a hydride or organometallic compound of a metal belonging to Groups I, II, or III.

In preparing the product of (1), the transition metal halide is used in an amount lower than 50% by weight, on the weight of the Mg or Zn halide.

For the active form of anhydrous Mg and Zn in halides we intend those having one or both of the following properties:

(A) In the X-ray powder spectrum of the active halide the diffraction line which, in the spectrum for the normal, inert Mg or Zn halide, has the highest intensity, is less intense and, in its place, a more or less broadened halo appears;

(B) the active halide has a surface area greater than 3 $m^2/g$, and preferably greater than 10 $m^2/g$.

The most active forms of the Mg or Zn halides are characterized in that the X-ray spectra thereof show broadening of the highest intensity diffraction line and/or have a surface area greater than 15 $m^2/g$.

In the case of anhydrous Mg chloride the X-ray spectrum of many active forms is characterized in that the diffraction line which in the spectrum for the normal inert $MgCl_2$ has the highest intensity and appears at a lattice distance (d) of 2.56 Å is less intense and in its place a broadened halo appears comprised within the range of d from 2.56 Å to 2.95 Å.

Likewise the X-ray spectrum of many active forms of Mg bromide is characterized in that the diffraction line which in the spectrum for the normal inert $Mg Br_2$ has the highest intensity and appears at a lattice distance d of 2.93 Å is less intense and in its place a broadened halo appears comprised within the range of d from 2.80 Å to 3.25 Å.

Another criterion for determining the state of activation of the Mg or Zn halide may be stated to be the increase of the valence from 3 to 4 which occurs in part of the titanium or vanadium in the Ti or V halide used, when said halide is contacted with the Mg or Zn halide in the active form under conditions, such as those used in preparing some supported catalysts of this invention, which conditions, in practice, do not completely exclude the presence of oxygen.

In fact, it has been found, and is a particular aspect of the active forms of Mg or Zn halides of this invention, that by using a Mg or Zn halide in an active form, or by operating under conditions such that the Mg or Zn halide is activated, the valence of the titanium or vanadium in part of the trihalide unexpectedly increases by one unit when the titanium or vanadium trihalide is brought into contact with the active Mg or Zn halide. No appreciable increase in valence occurs in practice when a Mg or Zn halide which is not activated in accordance with the invention is contacted under the same conditions with a titanium or vanadium trihalide.

Different methods can be used for preparing the supported catalysts of the present invention.

The preferred method consists of co-grinding mixtures of titanium or vanadium halides with an anhydrous Mg or Zn halide in which the proportion of the transition metal halide is less than 50% by weight, for a time and under grinding conditions sufficient to convert the Mg or Zn halide into an active form having properties or characteristics as described above.

In general, the grinding time depends on the grinding conditions and on the grinding efficiency of the equipment used. It has been found that the grinding time cannot be correlated with the fineness of the particles of the ground product.

For example, the time necessary to transform the starting mixture into a very active catalyst component is about one hour, when the co-grinding is carried out in a rotary centrifugal mill loaded with porcelain balls. Shorter times, such as 15 minutes or even less, are achieved with mills capable of developing a particularly intense grinding action, such as, for instance, vibrating mills loaded with steel balls.

Preferably, the co-grinding is performed in the absence of inert diluents.

The catalytic components comprising the active Mg or Zn halides and the titanium and vanadium halides may be prepared by simply mixing the solid transition metal halides with preactivated Mg and Zn halides. However, in that case, it is preferred to mix the halides in suspension in an inert solvent.

Furthermore, it has also been found very convenient to form the titanium or vanadium halide in situ. For example, $TiCl_3$ may be formed directly in the suspension containing the pre-activated Mg or Zn halides by reduction of $TiCl_4$ with organometallic aluminum compounds, in particular with dialkyl aluminum chlorides or alkyl aluminum dichlorides.

The suspensions thus obtained are preferably subjected to a thermal treatment at temperatures higher than room temperature, for instance at from 75° C. to 100° C., for a time sufficient for fixing the Ti or V compound on the support.

The Mg and Zn halides can be pre-activated by different methods. One method consists in subjecting the halides to a mechanical treatment such as grinding, which can be carried out substantially under the same conditions already indicated for co-grinding the mixed transition metal halide and Mg or Zn halide. Preferably, the grinding is performed in the absence of inert diluents and in a ball mill capable of developing an intensive grinding action.

However, it is also possible to obtain the Mg and Zn halides in activated form by starting with compounds of the formulae RMgX or RZnX, in which R is a hydrocarbon radical, in particular alkyl or aryl, and X is halogen, by subjecting the starting compound to decomposition according to known methods, or by reacting the starting compound with a stoichiometric, or greater than stoichiometric, amount of a halogenated compound, such as, for example, anhydrous hydrogen chloride.

Particularly good results are obtained, especially with respect to the yield of polymer obtained, referred to both the Ti or V halide and the Mg or Zn halide, when the amount of Ti or V halide used is between 1% and 10% by weight.

Among the titanium and vanadium halides in which the metal has a valence lower than its maximum valence and comprising, for instance, the metal trihalides and dihalides, the preferred compounds for use in preparing these catalysts are $TiCl_3$ and $VCl_3$, and products based on those trichlorides.

The trichlorides can be prepared by different methods. For instance, the $TiCl_3$ used may be the product obtained by one of the following methods:

(a) reduction of $TiCl_4$ with hydrogen, at temperatures higher than 600° C.;
(b) reduction of $TiCl_4$ with Al;
(c) reduction of $TiCl_4$ with organometallic compounds of Al.

Particularly good results have been obtained with the product having the composition $3\ TiCl_3 \cdot AlCl_3$ obtained by reducing $TiCl_4$ with aluminum metal and then grinding the reduction product to convert the $TiCl_3$ to the delta form.

Among the active forms of the Mg and Zn halides, the preferred are the active forms of $MgCl_2$, $MgBr_2$, and $ZnCl_2$.

Summing up, the catalysts of this invention are formed from the following components:

(1) the product obtained by contacting a titanium or vanadium halide in which the metal has a valence lower than 4, in particular $TiCl_3$ or $VCl_3$ or products based on those chlorides, with an anhydrous Mg or Zn halide in active form resulting from a pre-activation treatment or from activation during formation of the catalyst component (1), characterized in that the transition metal halide is used in an amount less than 50% by weight with respect to the Mg or Zn halide, in that the active Mg or Zn halide gives an X-ray powder spectrum in which the most intense diffraction line normally present in the powder spectrum of the inactive Mg or Zn halide is less intense and, in its place, a more or less broadened halo appears, and/or in that the active Mg or Zn halide has a surface area greater than 3 $m^2/g$., and (2) a hydride or organometallic compound of a metal belonging to Group I, II or III of the Mendelyeev Periodic System.

Organometallic compounds and hydrides which are particularly suitable for use as catalyst-forming component (2) include triethyl aluminum, diethyl aluminum chloride, tri-isobutyl aluminum, di-isobutyl aluminum chloride, diethyl aluminum sesquichloride, diethyl aluminum hydride, di-isobutyl aluminum hydride, diethyl aluminum bromide, lithium aluminum tetra-isobutyl, and lithium isobutyl.

The molar ratio between the organometallic compound or hydride and the titanium or vanadium halide is not critical. For the polymerization of ethylene, such ratio is preferably comprised between 50 and 1,000.

The polymerization and copolymerization of olefins with the aid of the present catalysts can be carried out in a liquid phase, in the presence or absence of an inert solvent; or in the gaseous phase, at temperatures comprised between −80° C. and 200° C., preferably between 50° C. and 100° C., and under atmospheric or increased pressure.

The molecular weight of the polymer or copolymer is regulated, during the course of the polymerization, by effecting the polymerization in the presence of known molecular weight regulating substances, for instance alkyl halides, organometallic compounds of zinc or cadmium, or hydrogen.

Using the present catalysts, it is possible to regulate the molecular weight of the polymer produced, even to relatively or very low values, without drastic decrease in the activity of the catalyst. This is in contrast to the fact that the activity of the conventional catalysts obtained from transition metal compounds and organometallic compounds of the Groups I to III metals, is considerably reduced when hydrogen and other chain transfer agents used for regulating the molecular weight are present in the polymerization zone.

For instance, when ethylene is polymerized in contact with the present catalysts, it is possible to regulate the molecular weight of the polyethylene formed within a practical range corresponding to values of the intrinsic viscosity comprised between about 1.5 and 3.0 dl/g as determined in tetralin at 135° C., without a decrease in the polymer yield to a value such that it would be necessary to purify the polymer of catalyst residues, at the end of the polymerization reaction.

The polyethylene obtained with the aid of the present catalysts is a substantially linear, highly crystalline polymer having a density equal to, or higher than, 0.96 g/cc. It is generally more readily processable than polyethylene obtained using the conventional catalysts prepared from transition metal compounds and to organometallic compounds, and in general contains less than 20 ppm of titanium even without being subjected to a purification treatment.

The following examples are given to illustrate the invention, and are not intended to be limiting. Unless otherwise stated, the percentages given are by weght.

EXAMPLES 1-10

Table I reports the results obtained by polymerizing ethylene in contact with catalysts according to this invention. One of the catalyst forming components was Al(iC$_4$H$_9$)$_3$. The other catalyst-forming component was obtained by grinding, for one hour, mixtures of TiCl$_3$ (of various origins) with anhydrous, initially inactive MgCl$_2$. The grinding was carried out in a centrifugal mill having a holding capacity of 330 ccs and containing 4 porcelain balls, two of which had a diameter of 31.9 mm, and two of which had a diameter of 40.9 mm.

Table I also reports, for comparative purposes, the data (Examples 9–10) on the polymerization of ethylene with a catalyst prepared by grinding MgCl$_2$ and a product of the composition 3 TiCl$_3$.AlCl$_3$ in which the TiCl$_3$ was present in the delta form, for one hour, under the conditions described above, and using the resulting component with Al(iC$_4$H$_9$)$_3$.

In all examples, the ethylene was polymerized in a stainless steel autoclave of 1.8 liters holding capacity. The autoclave was swept out with dry nitrogen and then charged with 1000 cc of technical n-heptane containing 2 g of Al(iC$_4$H$_9$)$_3$. The temperature in the autoclave was brought up to 75° C., and there was then introduced a suspension of the catalyst component prepared as shown in Table I, for each example, in 50 ccs of technical n-heptane. Immediately thereafter, 3 atm. of hydrogen and 10 atm. of etylene were introduced, and the temperature rose to about 85° C.

The pressure was then maintained constant by feeding ethylene continuously into the autoclave. After 4 hours, the suspension was discharged and the polyethylene was separated by filtration and dried under vacuum at 100° C.

TABLE 1

| | EXAMPLES | | | | | | | | | |
|---|---|---|---|---|---|---|---|---|---|---|
| | 1 | 2 | 3 | 4 | 5 | 6 | 7 | 8 | 9 | 10 |
| Co-grinding of TiCl$_3$—MgCl$_2$ | | | | | | | | | | |
| MgCl$_2$ g | 4.61 | 2.33 | 6.8 | 7.3 | 5.1 | 4.2 | 15.35 | 4 | 2.5 | |
| TiCl$_3$ a g | 1.19 | | | | | | | | | |
| TiCl$_3$ b g | | 0.455 | | | | | | | | |
| TiCl$_3$ c g | | | 0.053 | 0.1226 | 0.4768 | 0.8681 | 8.0 | 5.1998 | | 5 |
| Ground product: | | | | | | | | | | |
| Surface area m$^2$/g | | | 19 | 21 | 20 | 21 | | | 21 | |
| Ti° (total) % b.w. | 4.98 | 5.16 | 0.18 | 0.29 | 1.75 | 3.80 | 6.80 | 12.4 | | 24 |
| Ti+++ % b.w. | 1.05 | 1.00 | <0.05 | 0.08 | 0.9 | 2.25 | 3.65 | 5.95 | | 24 |
| Ground product used in polymerization g | 0.0614 | 0.107 | 0.2263 | 0.3583 | 0.0638 | 0.0312 | 0.0418 | 0.0220 | 0.140 | 0.324 |
| Results of polymerization | | | | | | | | | | |
| Polymer g | 398 | 463 | 335 | 440 | 332 | 326 | 485 | 390 | 0 | 169 |
| Yield in g polymer/ g total Ti | 131,000 | 84,000 | 825,000 | 423,000 | 297,000 | 276,000 | 141,000 | 143,000 | 0 | 21,600 |
| ($\eta$) in tetraline at 135° C. dl/g | 2.0 | 2.0 | 2.4 | 2.1 | 2.4 | 2.6 | 2.3 | 3.3 | | 3.9 | a = δ -TiCl$_3$ obtained from TiCl$_4$ by reduction with AlEt$_2$Cl
b = δ -TiCl$_3$ free of Al obtained from TiCl$_4$ by reduction with hydrogen and subsequent transformation into the delta form by grinding.
c = δ -TiCl$_3$ of composition 3TiCl$_3$.AlCl$_3$ obtained from TiCl$_4$ by reduction with Al and subsequent transformation into the delta form by grinding.

EXAMPLE 11

8.0 g of TiCl$_3$, obtained from TiCl$_4$ by reduction with Al and subsequently transformed into the delta form by grinding, 15.0 g of the starting MgCl$_2$ as used in the preceding examples, and 80 cc of n-heptane were introduced into a ball mill like that used in the preceding examples. The grinding lasted for 1 hour.

The analysis of the ground product, separated from the n-heptane, gave the following results: Ti(-total)=8.4%; Ti+++=5.1%.

0.0814 of the ground product were used as one catalyst-forming component in the polymerization of ethylene under the same conditions as those of examples 1–10.

There were obtained 237 g of polymer with a yield of 34,650 g/g Ti°. Its intrinsic viscosity, in tetralin at 135° C., was 3.4 dl/g.

EXAMPLE 12

25 g of TiCl$_3$, of the type used in example 11, and 83 g of an anhydrous MgCl$_2$, also of the type used in example 11, were co-ground for 18 hours in a vibratory mill loaded with steel balls. The analysis of the ground product showed: Ti° (total)=5.45%; Ti+++=2.80%.

The surface area was 45 mg$^2$/g. The x-rays spectrum of the product showed a broadening of the highest intensity diffraction line which appears at d=2.56 Å in the spectrum of MgCl$_2$ of the normal type.

0.0344 g of the ground product were then used as one catalyst-forming component in a polymerization test of ethylene, conducted under the same conditions as those indicated in the preceding examples. Thereby were obtained 450 g of polymer. The yield amounted to 240,000 g/g Ti°.

EXAMPLE 13

5.04 g of MgCl$_2$ of the same type as that used in the preceding examples were co-ground for 1 hour with 0.1649 g of VCl$_3$ in a ball mill of the type used in examples 1–10.

The content in V of the ground product amounted to 1.03%. 0.455 g of this ground product were then used as one catalyst-forming component, in the polymerization of ethylene under the same conditions as those of the preceding examples. Thereby were obtained 5 g of polymer with a yield of 3,200 g/g of V. The intrinsic viscosity ($\eta$) in tetralin at 135° C. was 4.0 dl/g.

The same polymerization test repeated with VCl$_3$, ground alone in the absence of MgCl$_2$, and by using 0.165 g of the ground product as one catalytic component, did not lead to any appreciable formation of polymer.

EXAMPLE 14

27.4 g of anhydrous ZnCl$_2$ were co-ground for 1 hour under the same conditions as those of examples 1–10, with 2.5952 g of TiCl$_3$ of the type used in example 11. The analysis of the ground product showed: Ti° (total)=1.85%; Ti+++=1.45%.

0.1316 g of the ground product were then used as one catalyst-forming component in the polymerization of ethylene under the same conditions as given in the preceding examples. Thereby were obtained 103 g of polymer with a yield of 42,300 g/g of Ti°. The intrinsic viscosity ($\eta$) in tetralin at 135° was 2.2 dl/g.

EXAMPLE 15

In a test tube were mixed 0.0716 g of δ-TiCl$_3$ obtained from TiCl$_4$ by reduction with Al, and 1.4 g of anhydrous MgCl$_2$ previously ground for 1 hour in a ball mill of the type used in examples 1–10.

The surface area of the ground MgCl$_2$ was 20 m$^2$/g. The analysis of Ti in the mixed product showed a Ti content equal to 1.17%.

0.268 g of the ground product was then used as one catalyst-forming component in the polymerization of ethylene, conducted under the same conditions as those of the preceding examples. Thereby were obtained 210 g of polyethylene with an intrinsic viscosity ($\eta$), in tetralin at 135° C., of 3.3 dl/g. The yield of polymer amounted to 66,500 g/g of Ti°.

EXAMPLE 16

Into a flask of 250 cc holding capacity, provided with a stirrer, and equipped with a reflux cooler, were introduced 150 cc of n-heptane, 7.5 g of anhydrous MgCl$_2$, which was previously ground under the same conditions as those of example 15, and 0.770 g of δ-TiCl$_3$ obtained from TiCl$_4$ by reduction with Al. This mixture was then heated to 75° C. and was maintained at that temperature for 1 hour, under stirring. It was then filtered and the product obtained was dried under vacuum. The analysis of the dried product showed: Ti° (total)=2.00% and Ti+++=1.75%.

0.2047 g of this dried product were used as one catalyst-forming component in the polymerization of ethylene, conducted under the same conditions as those of the preceding examples. Thereby were obtained 380 g of a polymer having an intrinsic viscosity, in tetralin at 135° C., of 2.5 dl/g. The yield of polymer was equal to 95,000 g/g of Ti°.

EXAMPLE 17

Into a flask of 250 cc holding capacity, fitted with a stirrer and provided with a dropping funnel, were introduced 40 cc of n-heptane, 5.3 g of anhydrous MgCl$_2$, previously ground under the same conditions as indicated in example 15, and 0.120 g of TiCl$_4$. Thereupon the temperature was brought down to 0° C. and 0.0570 g of Al(C$_5$H$_5$)$_2$Cl dissolved in 20 cc of n-heptane were slowly dropped into the flask.

The temperature was then allowed to rise to 10° C., and the mixture was filtered, washed with heptane, and then dried under vacuum. The analysis of the product thus obtained showed: Ti° (total)=0.12%; Ti+++=0.05%; Al=0.1%.

0.3227 g of the dried product were then used in the polymerization of ethylene under the same conditions as those of the preceding examples. Thereby were obtained 451 g of polymer with an intrinsic viscosity ($\eta$) in tetralin at 135° C. of 2.2 dl/g. The yield in polymer amounted to 1,116,000 g/g of Ti°.

EXAMPLE 18

Following the same procedures and using a flask of the same type as in the preceding example, 0.310 g of TiCl$_4$ was reacted with 1.17 g of Al(C$_2$H$_5$)$_2$Cl in the presence of 4.65 g of MgCl$_2$ of the same type as used in said example.

After allowing the temperature to rise to 10° C., the mixture was reflux-heated for 1 hour. It was then cooled down, filtered and dried under vacuum. The product thus obtained, when analyzed, gave the following results: Ti° (total)=2.1%; Ti+++=1.60%.

0.3227 g of this product were then used in the polymerization of ethylene, under the same conditions as those of the preceding examples. Thereby were obtained 423 g of polymer having an intrinsic viscosity ($\eta$) in tetralin at 135° C., of 2.1 dl/g. The yield in polymer amounted to 423,000 g/g of Ti°.

EXAMPLE 19

Using the same procedure as in the preceding example, 0.36 g of TiCl$_4$ was reacted with 0.23 g of Al(C$_2$H$_5$)$_2$Cl, in the presence of 4 g of MgCl$_2$ obtained by decomposition of a solution in ether of C$_2$H$_5$MgCl, into which gaseous HCl was bubbled until the Mg chloride precipitated, which was then filtered and dried at 200° C. under vacuum. The MgCl$_2$ so obtained had a surface area of 142 m$^2$/g. Its X-ray powder spectrum showed a marked broadening of the highest intensity diffraction line which appears at d=2.56 in the spectrum of MgCl$_2$ of the normal type.

Thereupon the temperature was allowed to rise to 10° C.; the mixture was then filtered, washed in heptane and finally dried under vacuum. On analysis, the product thus obtained showed the following results: Ti° (Total)=0.36%; Ti+++=0.05%; Al=0.26%.

0.0816 g of the dried product were used in the polymerization of ethylene under the same conditions as given in the preceding examples. Thereby were obtained 253 g of a polymer having an intrinsic viscosity, in tetralin at 135° C., of 2.7 dl/g. The yield in polymer amounted to 865,000 g/g of Ti°.

EXAMPLE 20

A catalytic component prepared following the same procedures as those of examples 1 to 8 and containing 2% of Ti(total), was used in the polymerization of mixtures of ethylene and propylene, conducted under the following conditions:

Into a 1.8 liter autoclave were introduced 1000 cc of n-heptane having dissolved therein 2 g of $Al(iC_4H_9)_3$. The temperature was then brought up to 75° C.

Thereupon 80 cc of liquid propylene and gaseous ethylene were fed into the autoclave to a total pressure of 10 atm. Immediately thereafter were introduced 50 cc of n-heptane containing in suspension 0.1259 g of the catalytic component prepared as described above.

At this the temperature rose to 85° C. After 1 hour the reaction mixture was discharged from the reactor and from this mixture were recovered 154 g of polymer. The yield of the catalyst was 58,000 g of copolymer/g of Ti.

EXAMPLE 21

A catalytic component, prepared according to the procedures followed in examples 1–8 and containing 2.7% of Ti(total), was used in a polymerization test on propylene.

Into a 5 liter autoclave were loaded 1000 cc of n-heptane having dissolved therein 5.4 g of $Al(C_2H_5)_2Cl$. This solution was then brought to a temperature of 75° C.

Thereupon 50 cc of n-heptane containing in suspension 1.858 g of the catalytic component prepared as described above were introduced into the autoclave. Immediately thereafter a gaseous mixture of propylene and hydrogen containing 6.5Nl of hydrogen per kg of propylene was introduced, to a total pressure of 8 atm. Thereby the temperature rose to 85° C. The pressure was maintained constant by continuously feeding in propylene. After 5 hours, there were obtained 220 g of polymer with a yield of 4400 g/g of Ti.

A comparative test was carried out under the same conditions of polymerization indicated above, by using, however, 1.5 g of $\delta$-$TiCl_3$ of composition 3 $TiCl_3$. $AlCl_3$ and 4.7 g of $Al(C_2H_5)_2Cl$. This test gave, after 5 hours, 1200 g of polymer with a yield of 2550 g/g of Ti.

EXAMPLE 22

7.1 g of magnesium bromide initially in a non-active form and 0.5120 g of titanium trichloride of the type used in Example 11 were ground together for 3 hours in a ball mill of the type used in Examples 1 to 10. The content in titanium of the ground product was 1.6%. Its surface area was 27 sq.m$^2$/g. 0.051 g of this product was used in the polymerization of ethylene according to Examples 1 to 10. After 4 hours there were obtained 322 g of a polymer having an intrinsic viscosity of 2.3 dl/g. The yield in polymer was 400,000 g/g titanium.

EXAMPLE 23

10 g of magnesium chloride having a surface area of 1 sq.m/g and 0.5 g of titanium dichloride were ground together for 1 hour in a ball mill of the type used in Examples 1 to 10. The titanium content of the ground product was 1.6%. 0.2204 g of this product was used in the polymerization of ethylene as in Examples 1 to 10. After 4 hours there were obtained 284 g of polyethylene having an intrinsic viscosity in tetralin at 135° C.=1.2 dl/g. The yield in polymer amounted to 79,000 g/g titanium.

EXAMPLE 24

Following the same procedure and using a flask as in Example 17, 0.72 g of titanium tetrachloride was made to react with 0.342 g aluminium diethyl monochloride ($Al(C_2H_5)_2Cl$) in the presence of 8 g of magnesium chloride obtained by fast evaporation of a solution in 200 cc of methanol of 15 g of magnesium chloride having a surface area of 1 sq.m/g and then completing the removal of the alcohol by heating the magnesium chloride at 300° C. under vacuum. The so obtained magnesium chloride had a surface area of 32 sq.m/g. Its X-ray spectrum showed a marked broadening of the diffraction line appearing at d=2.56 Å in the spectrum of magnesium chloride of the normal type. The temperature was allowed to rise to 10° C., the mixture was filtered washed in heptane and dried under vacuum. 0.1820 g of this product was used in the polymerization of ethylene as in Examples 1 to 10. After 4 hours there were obtained 382 g of polymer having an intrinsic viscosity in tetralin at 135° C. of 2.7 dl/g.

Similar results are obtained when other hydrides or organo-metallic compounds of the Groups I to III metals are used as one catalyst-forming component, and as disclosed herein.

As will be understood, various changes and modifications in details may be made in practicing the invention without departing from the spirit thereof. Therefore, we intend to include in the scope of the appended claims all such modifications as will be obvious to those skilled in the art, from the description and working examples given herein.

We claim:

1. Components of catalysts for the polymerization of olefins comprising the product obtained by contacting a transition metal halide selected from titanium and vanadium halides in which the metal has a valence lower than 4, with an active form of an anhydrous magnesium dihalide, the titanium or vanadium halide being used in an amount less than 50% by weight with respect to the magnesium dihalide, and the active magnesium dihalide being characterized in that, in its X-rays powder spectrum, the most intense diffraction line present in the spectrum of the normal, non-active magnesium dihalide is less intense and, in its place, a broadened halo appears.

2. Components of catalysts according to claim 1, and comprising the product obtained by contacting the transition metal halide with anhydrous magnesium dichloride or anhydrous magnesium dibromide.

3. Components of catalysts according to claim 1, and comprising the product obtained by contacting $TiCl_3$ with the anhydrous magnesium dihalide.

4. Components of catalysts according to claim 1, and comprising the product obtained by contacting $TiCl_3$ with anhydrous $MgCl_2$ or anhydrous $MgBr_2$.

5. A component useful in preparing a catalyst for the polymerization of olefins, said component being obtained by contacting a transition metal halide which is a titanium or vanadium halide in which the metal has a valence lower than 4, with a support the essential support material of which is an active $MgCl_2$, the titanium or vanadium halide being used in an amount less than 50% by weight with respect to the $MgCl_2$, and the $MgCl_2$ being characterized in that, in its X-rays powder spectrum, the diffraction line which, in the spectrum for the normal inert $MgCl_2$, has the highest intensity and appears at a lattice distance (d) of 2.56 Å is less intense and in its place a broadened halo appears in a range of lattice distances (d) comprised from d=2.56 Å to d=2.95 Å.

6. A component according to claim 5, in which the transition metal halide is $TiCl_3$.

7. A component useful in preparing a catalyst for the polymerization of olefins, said component being prepared by contacting a transition metal halide which is a titanium or vanadium halide in which the metal has a valence lower than 4, with a support the essential support material of which is an active $MgBr_2$, the titanium or vanadium halide being used in an amount less than 50% by weight with respect to the $MgBr_2$, and the $MgBr_2$ being characterized in that, in its X-rays powder spectrum, the diffraction line which in the spectrum for the normal inert $MgBr_2$ has the highest intensity and appears at a lattice distance d of 2.93 Å is less intense and in its place a broadened halo appears in a range of lattice distances (d) comprised from d=2.80 Å to d=3.25 Å.

8. A component according to claim 7, in which the transition metal halide is $TiCl_3$.

9. Catalysts for the polymerization of olefins, consisting of the product obtained by mixing
   (a) a hydride or organometallic compound of a metal belonging to one of Groups I to III inclusive of the Mendelyeev Periodic System with
   (b) the product obtained by contacting a titanium or vanadium halide in which the metal has a valence lower than 4, with an active form of an anhydrous magnesium dihalide, the transition metal halide being used in an amount less than 50% by weight with respect to the magnesium dihalide, and the active magnesium dihalide being characterized in that in its X-rays powder spectrum the most intense diffraction line present in the spectrum of the normal non-active magnesium dihalide is less intense and, in its place, a broadened halo appears.

10. Catalysts according to claim 9, in which the magnesium dihalide is $MgCl_2$.

11. Catalysts according to claim 9, in which the magnesium dihalide is $MgBr_2$.

12. Catalysts according to claim 9, in which the transition metal halide is $TiCl_3$ and the magnesium dihalide is $MgCl_2$.

13. Catalysts according to claim 9, in which the transition metal halide is $TiCl_3$ and the magnesium dihalide is $MgBr_2$.

14. Catalysts according to claim 9, in which the transition metal halide is delta-$TiCl_3$ obtained by reducing $TiCl_4$ with aluminum metal and then grinding the reduction product to convert $TiCl_3$ to the delta form.

15. Catalysts according to claim 9, in which component (a) is an alkyl Al compound.

16. Catalysts according to claim 9, in which the transition metal halide is $TiCl_3$, the magnesium dihalide is $MgCl_2$, and component (a) is an alkyl Al compound.

17. Catalysts according to claim 9, in which the transition metal halide is $TiCl_3$, the magnesium dihalide is $MgBr_2$, and component (a) is an alkyl Al compound.

18. Catalysts according to claim 9, in which the transition metal halide is $TiCl_3$ and the magnesium dihalide is $MgCl_2$.

19. Catalysts according to claim 9, in which the transition metal halide is $TiCl_3$ and the magnesium dihalide is $MgBr_2$.

20. Catalysts according to claim 9, in which the transition metal halide is delta-$TiCl_3$ obtained by reducing $TiCl_4$ with aluminum metal and then grinding the reduction product to convert $TiCl_3$ to the delta form.

21. Catalysts according to claim 9, in which the transition metal halide is $TiCl_3$, the magnesium dihalide is $MgCl_2$, and component (a) is an alkyl Al compound.

22. Catalysts according to claim 9, in which the transition metal halide is $TiCl_3$, the magnesium dihalide is $MgBr_2$, and component (a) is an alkyl Al compound.

23. Method for preparing the catalysts as defined in claim 9, characterized in that catalyst-forming component (a) is mixed with a catalyst-forming component (b) prepared by co-grinding the titanium or vanadium halide with an anhydrous magnesium dihalide, to thereby convert the magnesium dihalide to the active form.

24. The method according to claim 23, further characterized in that the co-grinding is performed in a ball mill in the absence of inert diluents.

25. The method according to claim 23, characterized in that catalyst-forming component (b) is prepared by grinding a mixture of a titanium trihalide and anhydrous magnesium dihalide.

26. The method according to claim 23, characterized in that catalyst-forming component (b) is prepared by grinding anhydrous magnesium dichloride or anhydrous magnesium dibromide with delata-$TiCl_3$ obtained by reduction of $TiCl_4$ with aluminum and conversion to the delta-form by grinding.

27. The method for preparing the catalysts as defined in claim 9, characterized in that catalyst-forming component (a) is mixed with a catalyst-forming component (b) prepared by contacting the titanium or vanadium halide with a magnesium dihalide obtained by decomposition of an organometallic compound of the formula RMgX in which R is a hydrocarbon radical and X is a halogen.

28. The method according to claim 27, further characterized in that the magnesium dihalide is obtained from the organometallic compound RMgX by reaction of the latter with at least the stoichiometric amount of anhydrous hydrogen chloride.

29. The method according to claim 27, characterized in that the titanium or vanadium halide is brought into contact with an inert solvent suspension of the magnesium dihalide.

30. The method according to claim 29, further characterized in that catalyst-forming component (b) is prepared from a titanium trichloride formed in the suspension containing the magnesium dihalide by reduction of $TiCl_4$ with an organometallic compound of aluminum.

31. The method according to claim 30, further characterized in that the organometallic compound of aluminum used for reducing the $TiCl_4$ has the formula $R_2AlCl$ or $RAlCl_2$ in which R is an alkyl radical.

32. A process for the polymerization of ethylene and mixtures thereof with at least one other monomer selected from the group consisting of higher alpha-olefins and diolefins, characterized in that the polymerization is carried out in the presence of a catalyst according to claim 9.

33. The process according to claim 32, further characterized in that the polymerization is carried out at a temperature of from −80° C. to +200° C., in an inert liquid and in the presence of a regulator of the molecular weight of the polymer, and in that the polymer obtained does not require any purification treatment for removal of catalyst residues.

34. The process according to claim 32, characterized in that the polymerization is carried out in the absence of an inert liquid diluent.

35. A process for the polymerization of olefins comprising polymerizing an olefin in the presence of a catalyst consisting of the product obtained by mixing
  (1) a hydride or organometallic compound of a metal belonging to Groups I–III inclusive of the Mendelyeev Periodic System with
  (2) the product obtained by mechanical co-comminution of a titanium or vanadium halide in which the metal has a valence lower than 4 with a magnesium dihalide until the most intense diffraction line in the X-rays powder spectrum of the normal non-comminuted magnesium dihalide is less intense and in its place a broadened halo appears, said titanium or vanadium halide being used in an amount less than 50% by weight with respect to the magnesium dihalide.

36. Process for preparing components of catalysts for the polymerization of olefins comprising contacting a transition metal halide selected from titanium and vanadium halides in which the metal has a valence lower than 4, with an anhydrous magnesium dihalide in an active form characterized in that in the X-rays powder spectrum thereof the most intense diffraction line present in the spectrum of the normal non-active magnesium halide is less intense and, in its place, a broadened halo appears, the titanium or vanadium halide being used in an amount less than 50% by weight with respect to the magnesium dihalide.

37. The process of claim 36, in which the transition metal halide is $TiCl_3$.

38. The process of claim 36, in which the anhydrous magnesium dihalide is magnesium dichloride or magnesium dibromide.

39. The process of claim 36, in which the transition metal halide is $TiCl_3$ and the anhydrous magnesium dihalide is $MgCl_2$ or $MgBr_2$.

40. The process of claim 36, in which the titanium or vanadium halide is coground with a normal, non-active magnesium dihalide until said dihalide is converted to an active form characterized in that, in its X-rays powder spectrum, the most intense diffraction line present in the spectrum of the normal, non-active magnesium dihalide is less intense and, in its place, a broadened halo appears.

41. The process of claim 40, in which the transition metal halide is $TiCl_3$.

42. The process of claim 40, in which the magnesium dihalide is anhydrous magnesium dichloride or anhydrous magnesium dibromide.

43. The process of claim 40, in which the transition metal halide is $TiCl_3$ and the anhydrous magnesium dihalide is $MgCl_2$ or $MgBr_2$.

44. The process of claim 36, in which the transition metal halide is contacted with a preactivated anhydrous magnesium dihalide.

45. The process of claim 44, in which the anhydrous magnesium dihalide is preactivated by grinding.

46. The process of claim 45, in which $TiCl_3$ is contacted with the preactivated anhydrous magnesium dihalide.

47. The process of claim 45, in which the transition metal halide is contacted with preactivated anhydrous magnesium dichloride or preactivated anhydrous magnesium dibromide.

48. The process of claim 45, in which $TiCl_3$ is contacted with preactivated anhydrous $MgCl_2$ or preactivated anhydrous $MgBr_2$.

49. The process of claim 44, in which the transition metal halide is contacted with a preactivated anhydrous magnesium dihalide obtained by decomposition of a compound of formula RMgX, in which R is a hydrocarbon radical and X is halogen.

50. The process of claim 49 in which, in the formula RMgX, R is alkyl or aryl.

51. The process of claim 44, in which the preactivated anhydrous magnesium dihalide is obtained by reacting a compound of formula RMgX, in which R is a hydrocarbon radical and X is halogen, with at least the stoichiometric amount of an anhydrous halogenated substance.

52. The process of claim 51, in which the anhydrous halogenated substance is anhydrous hydrogen chloride.

53. The process of claim 51, in which, in the formula RMgX, R is alkyl or aryl.

54. The process according to claim 44, in which the active magnesium dihalide is obtained from a solution of the dihalide in an organic solvent by partially evaporating the solvent and then completing removal of the solvent at a temperature above 100° C. and under reduced pressure.

55. The process of claim 36, in which the anhydrous magnesium dihalide is coground with delta-$TiCl_3$ obtained by reduction of $TiCl_4$ with aluminum and conversion of the reduction product to delta-$TiCl_3$ by grinding.

56. The process of claim 55, in which the anhydrous magnesium dihalide is anhydrous magnesium dichloride or anhydrous magnesium dibromide.

57. The process of claim 36, in which an inert solvent suspension of the titanium or vanadium halide is brought into contact with an inert solvent suspension of the magnesium dihalide.

* * * * *